No. 626,175. Patented May 30, 1899.
O. B. LOFSTEDT.
TENSION DEVICE FOR TWINE BINDERS.
(Application filed Jan. 14, 1899.)
(No Model.)
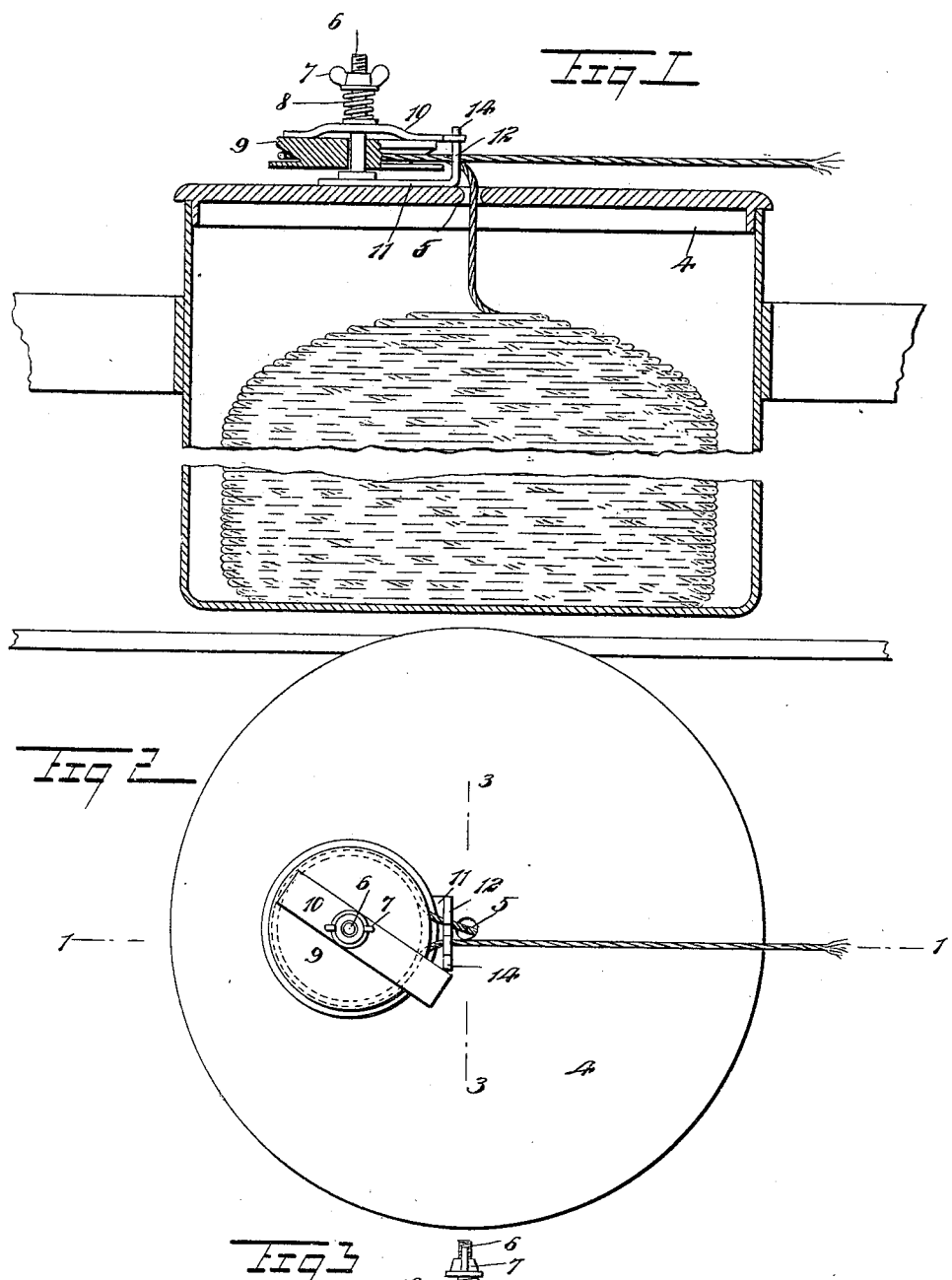
WITNESSES:
H. Walker
Isaac B. Owens
INVENTOR
Otis B. Lofstedt
BY Munn & Co
ATTORNEYS.

UNITED STATES PATENT OFFICE.

OTIS BENJAMIN LOFSTEDT, OF RIPPEY, IOWA.

TENSION DEVICE FOR TWINE-BINDERS.

SPECIFICATION forming part of Letters Patent No. 626,175, dated May 30, 1899.

Application filed January 14, 1899. Serial No. 702,167. (No model.)

*To all whom it may concern:*

Be it known that I, OTIS BENJAMIN LOFSTEDT, of Rippey, in the county of Greene and State of Iowa, have invented a new and Improved Tension Device for Twine-Binders, of which the following is a full, clear, and exact description.

This invention relates to a device adapted to be carried on the cover of the twine-box of binding-machines and by which to regulate the tension of the twine, permitting the twine to be drawn uniformly from the box irrespective of variations of strain on the twine and in the form of the twine.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is a sectional view of the invention on the line 1 1 of Fig. 2. Fig. 2 is a plan view of the invention. Fig. 3 is an elevational view, a part of the twine-box being in section on the line 3 3 of Fig. 2.

The cover 4 of the twine-box is formed with an opening 5 therein, wherethrough passes the twine from the coil within the box. Standing rigidly on the cover 4 is a pin 6, the upper portion of which is threaded to carry a thumb-nut 7, which regulates the tension of an expansion-spring 8, carried on the pin. The lower portion of the pin carries revolubly a grooved wheel 9. This wheel may be of any construction; but it is preferably formed with a groove of the V or tapering form shown in Fig. 1, which has two walls converging at an acute angle and disposed the one adjacent to and approximately parallel with the lower side face of the wheel and the other at an acute angle thereto. This groove causes the wheel to be engaged by the twine with a uniform pressure, notwithstanding that the twine may have various thicknesses. Pressed down by the spring 8 is a bowed brake-bar 10, lying horizontally on the upper face of the wheel 9 and bearing against the same at each end of the brake-bar. By adjusting the tension of the spring 8 the force with which the brake-bar engages the wheel may be regulated, and consequently the tension of the twine passing to the knotter is regulated. Held fast to the top of the cover 4, below the wheel 9 and by means of the pin 6, is a plate 11, one end of which projects beyond the periphery of the wheel and is bent upwardly to form a guide 12, provided with a horizontal elongated opening 13, through which passes the twine from the opening 5 and through which also passes the twine on its way to the knotter from the wheel 9. The guide 12 has an upwardly-extended stud 14, forming a stop for the brake-bar 10, which brake-bar has one end projected beyond the periphery of the wheel 9 for the purpose of engaging with the stud 14. By means of the device thus constructed the twine may be drawn from the box with uniform regularity, and the variations in the strain placed on the twine by the action of the knotter, as well as the inequalities in the size of the twine, will not affect the uniformity and regularity of the delivery. The bar 10 is caused to stand still, and thus exercise its retarding influence upon the wheel 9, by means of the stud 14.

Having thus described my invention, I claim as new and desire to secure by Letters Patent—

1. The combination with a support, of a pin standing thereon, a wheel mounted loosely on the pin, a spring carried on the pin above the wheel, a brake-bar interposed between the spring and wheel and bearing on the latter to retard its vertical movement, a plate secured on the support beneath the wheel and having an upturned end forming a catch, the guide being provided with an opening for the passage of the twine therethrough, and a stud projecting upwardly from the guide and serving to prevent the movement of the brake-bar.

2. The combination with a support, of a pin standing thereon, a grooved wheel mounted loosely on the pin, a guide carried on the support and having an opening therein, a stud projected upwardly from the guide, a brake-bar mounted on the pin and held from movement by means of the stud, and a spring bearing down on the brake-bar to press the same against the wheel.

3. In a tension device, the combination of a wheel, a brake-bar bearing on and having a portion positioned beyond the same, and a twine-guide adjacent to the wheel and with which the brake-bar may engage to hold the brake-bar.

OTIS BENJAMIN LOFSTEDT.

Witnesses:
S. W. JOHNSON,
J. H. SHEPLEY.